Figure 3:
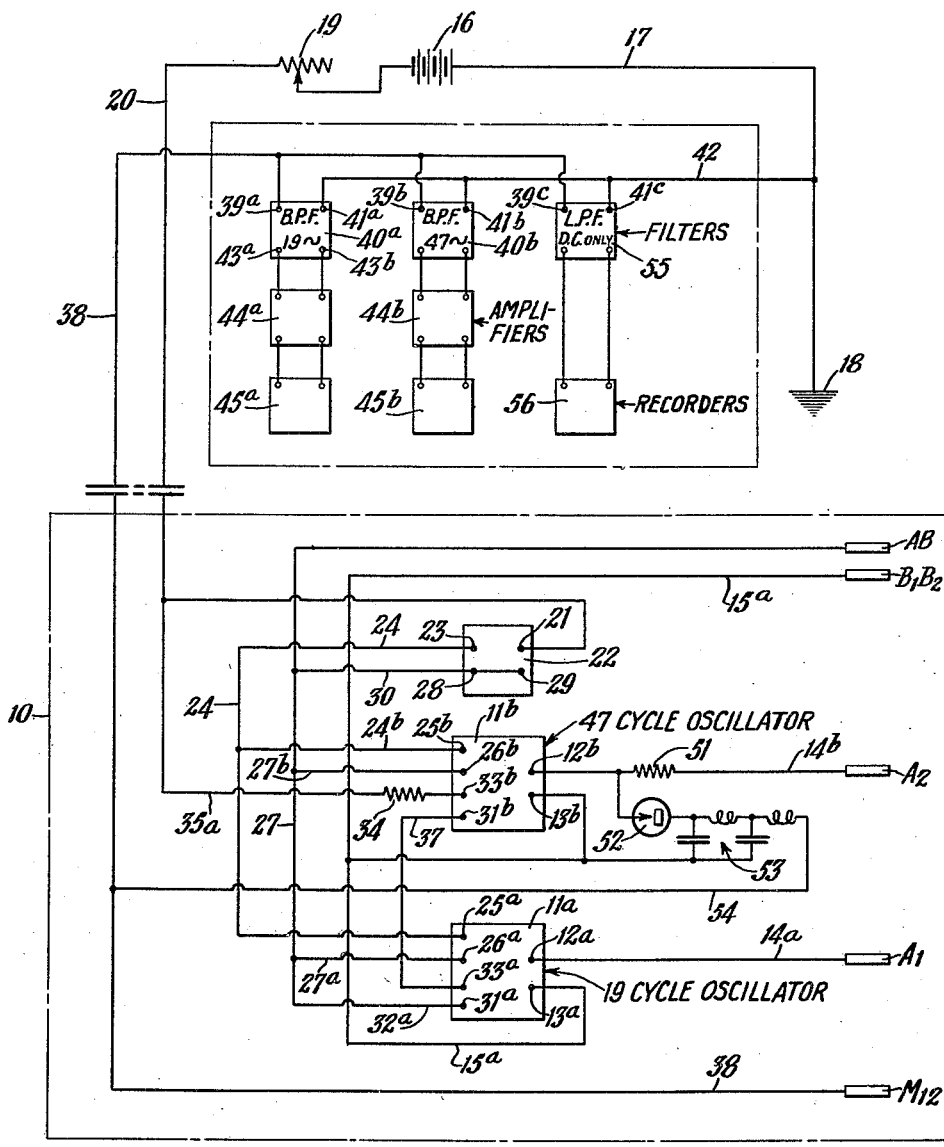

Dec. 3, 1946.   C. B. AIKEN   2,411,843
COMPENSATING MEANS FOR ELECTRICAL BORE HOLE APPARATUS
Filed Sept. 24, 1942   2 Sheets-Sheet 1
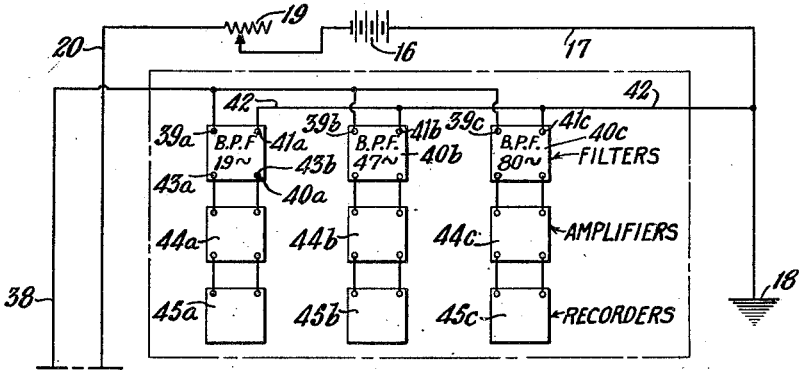
Fig: 1.
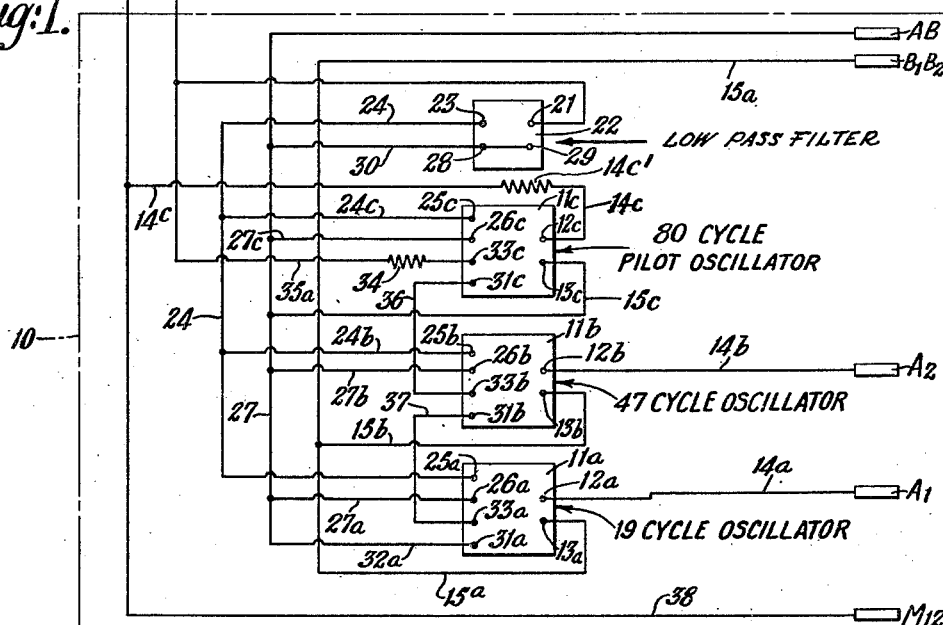
Fig: 2.
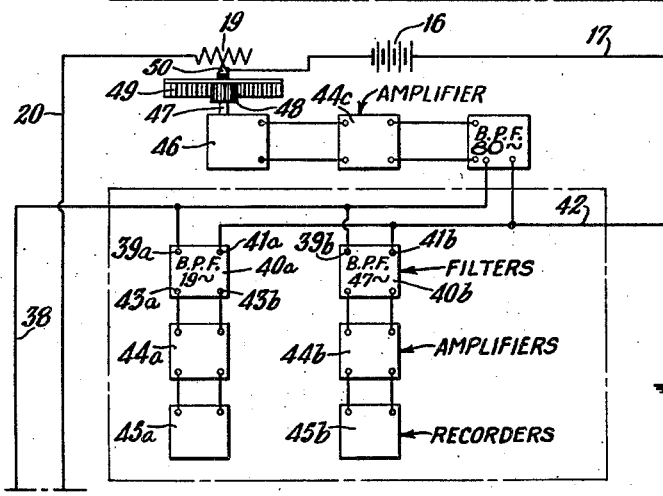
INVENTOR
CHARLES B. AIKEN
BY
Noguet, Neary & Campbell
ATTORNEYS Patented Dec. 3, 1946

2,411,843

UNITED STATES PATENT OFFICE 2,411,843

COMPENSATING MEANS FOR ELECTRICAL BOREHOLE APPARATUS

Charles B. Aiken, North Plainfield, N. J., assignor to Schlumberger Well Surveying Corporation, Houston, Tex., a corporation of Delaware Application September 24, 1942, Serial No. 459,508

6 Claims. (Cl. 175—182)

This invention relates to electrical bore hole apparatus and more particularly to means for compensating for the influence of external conditions upon the operation of such apparatus.

It has become the generally accepted practice in petroleum engineering to investigate different subjects of interest in a petroleum bore hole for the purpose of compiling data from which the levels of oil bearing formations and their approximate oil content may be deduced. Such investigations are usually made electrically by lowering suitable electrical apparatus into the bore hole and recording the responses thereof at different depths by apparatus located either at the surface or in the bore hole. Frequently a plurality of different subjects of interest in the bore hole are investigated simultaneously.

Experience has shown that the operating characteristics of such investigating apparatus may be influenced by conditions in the bore hole. For example, the temperature in a bore hole increases with depth. Inasmuch as the electrical properties of the electrical components of the investigating apparatus may be a function of the temperature, they may tend to change as the apparatus is moved through the bore hole, thereby producing undesirable modifications of its operating characteristics.

It is an object of the invention, accordingly, to provide means for compensating for unwanted variations in the operating characteristics of electrical bore hole investigating apparatus that may occur during a run in the bore hole.

Another object of the invention is to provide compensating means of the above character for compensating for undesirable variations in the operating characteristics of electrical bore hole apparatus that are produced by temperature variations in the bore hole.

A further object of the invention is to provide compensating means of the above character which is adapted to function automatically.

Still another object of the invention is to provide means for indicating to an observer at the surface of the earth that an undesired variation in the operating characteristics of electrical investigating apparatus disposed in a bore hole has taken place, and to provide manually operable means for compensating for such variation.

The objects of the invention are attained by disposing with the investigating apparatus in the bore hole means for providing an electrical signal that varies in substantially the same manner as the operating characteristic of the investigating apparatus which is to be controlled.

The response of the investigating apparatus, and the electrical signal, which will respond in substantially the same manner to variations in a condition of the bore hole, such as its temperature, for example, may both be visually indicated to an observer at the surface of the earth. The investigating apparatus is preferably energized from a source of electrical energy controllable from the surface of the earth. Compensation for any undesired variations in the operating characteristic of the investigating apparatus is provided by adjusting the electrical energy supplied by the source to maintain the electrical signal substantially constant.

In another embodiment of the invention, the adjustment of the source of electrical energy to maintain the electrical signal substantially constant is accomplished automatically in response to any deviation of said signal from a reference value.

The invention may be better understood from the following detailed description of several representative embodiments taken in conjunction with the accompanying drawings, in which:

Fig. 1 is a schematic diagram of compensating means constructed according to the invention, Fig. 2 illustrates schematically a modified form of the invention in which the compensation is accomplished automatically; and Figure 3 illustrates a further embodiment of the invention.

While the compensating means of the present invention may be applied to a variety of electrical bore hole investigating apparatus, for purposes of illustration, it will be described in conjunction with an electrical well logging system of the type described in the copending application of Henri-Georges Doll, for Well logging system, filed January 5, 1943, Serial Number 471,333. In such a system, indications are obtained simultaneously of the electrical resistivity of the surrounding earth formations at a plurality of different depths of investigation from the bore hole.

Referring now to Fig. 1, the electrical investigating apparatus 10, which is adapted to be disposed in a bore hole, comprises a plurality of similar electrical oscillators 11a, 11b and 11c, of conventional type, which are designed to generate alternating currents of 19, 47 and 80 cycles, respectively, for example. As indicated in the aforementioned copending application of Henri-Georges Doll, any desired frequencies may be chosen, provided that none is a harmonic of the others, or of any power frequency that may be present, such as 60 cycles, for example.

The oscillators 11a, 11b and 11c may include one or more stages of amplification, if desired.

The output terminals 12a and 13a of the oscillator 11a are connected by the conductors 14a and 15a, respectively, to the power electrodes $A_1$ and $B_1B_2$, which are spaced apart a relatively large distance in the bore hole. In similar fashion, the output terminal 12b of the oscillator 11b is connected by a conductor 14b to a second power electrode $A_2$, which is spaced apart a relatively short distance from the electrode $A_1$. The output terminal 13b of the oscillator 11b is connected by a conductor 15b and the conductor 15a to the electrode $B_1B_2$.

The oscillators 11a, 11b and 11c are adapted to be energized by a direct current source of electrical energy 16, located at the surface of the earth, one terminal of which is connected by a conductor 17 to a ground point 18 and the other terminal of which is connected through a variable resistance 19 to a conductor 20 in the supporting cable (not shown). The lower end of the energizing conductor 20 is connected to one input terminal 21 of a conventional type low pass filter 22, which is designed so that its cut-off frequency lies below 19 cycles, the lowest frequency generated by the oscillators 11a, 11b and 11c. The low pass filter 22 serves to keep alternating currents of any frequencies out of the power circuits of the oscillators 11a, 11b and 11c.

The output terminal 23 of the low pass filter 22 is connected by a conductor 24 to the power input terminal 25a of the oscillator 11a, the power input terminal 26a of which is connected by the conductors 27a and 27 to a ground electrode AB disposed in the bore hole with the apparatus 10. In similar fashion, the power input terminals of the oscillators 11b and 11c are connected through similar conductors to the conductors 24 and 27, corresponding parts being designated by corresponding reference characters with appropriate subscripts. The output terminal 28 of the low pass filter 22 is connected to the input terminal 29 thereof and by the conductors 30 and 27 to the ground electrode AB.

The filament circuits of the oscillators 11a, 11b and 11c, and of any amplifier circuits that may be associated therewith, are preferably connected in series. To this end, the filament terminal 31a of the oscillator 11a is connected by a conductor 32a to the ground conductor 27 and the filament terminal 33c of the oscillator 11c is connected through a voltage dropping resistance 34 and the conductor 35a to the energizing conductor 20. The filament terminal 31c of the oscillator 11c is connected by the conductor 36 to the filament terminal 33b of the oscillator 11b, the filament terminal 31b of which is connected by the conductor 37 to the filament terminal 33a of the oscillator 11a.

As indicated in the above mentioned copending application of Henri-Georges Doll, the 19 and 47 cycle alternating currents impressed upon the power electrodes $A_1$ and $B_1B_2$ and $A_2$ and $B_1B_2$, respectively, create in the surrounding earth formations between those electrodes 19 and 47 cycle alternating electric fields, respectively. Disposed a predetermined distance away from the power electrodes $A_1$ and $A_2$ is a pick-up electrode $M_{12}$, upon which are impressed potential differences produced by the created fields. These potential differences are functions of the electrical resistivities of the earth formations at lateral depths of investigation from the bore hole approximately equal to the spacings between electrodes $A_1$ and $M_{12}$ and $A_2$ and $M_{12}$, respectively.

The potential differences impressed upon the electrode $M_{12}$ are transmitted through a second conductor 38 in the supporting cable, the upper end of which is connected to the input terminals 39a and 39b of conventional type band pass filters 40a and 40b, which are designed to pass 19 cycle and 47 cycle alternating electrical values, respectively. The input terminals 41a and 41b of the band pass filters 40a and 40b are connected by a conductor 42 to the ground point 18 at the surface of the earth. The output terminals 43a and 43b of the band pass filter 40a are connected to a conventional type amplifier 44a, the output of which is supplied to a conventional type recorder 45a. In similar fashion, the output of the band pass filter 40b is amplified by a conventional type amplifier 44b and supplied to a conventional type recorder 45b.

The output of the oscillator 11c, which is substantially constant in magnitude, is also transmitted to suitable indicating apparatus at the surface of the earth. To this end, the output terminal 12c thereof is connected in series with a conductor 14c and a voltage dropping resistor 14c' to the conductor 38 in the supporting cable (not shown) and its output terminal 13c is connected by the conductors 15c and 27 to the ground electrode AB in the bore hole. At the surface of the earth, the output from the oscillator 11c is transmitted through the conductor 38 to the input terminal 39c of a conventional type band pass filter 40c, responsive only to 80 cycle alternating electrical values, the other input terminal 41c of which is connected by the conductor 42 to the ground point 18. The output of the filter 40c is amplified by a conventional type amplifier 44c and supplied to a conventional type recorder 45c.

If the reading of the recorder 45c remains substantially constant as the investigating apparatus 10 is lowered through a bore hole, it is assumed that the outputs of the oscillators 11a, 11b and 11c are constant and have not changed. However, if a change is observed in the reading of the recorder 45c, it is assumed that corresponding changes have taken place in the outputs of the oscillators 11a and 11b, perhaps because of temperature variations in the bore hole. In order to compensate for the changes thus produced, the observer, at the surface of the earth, adjusts the variable resistance 19 until the reading of the recorder 45c is restored to its original value. When that has been done, the outputs of the oscillators 11a and 11b likewise will have been restored to their original values.

If desired, the compensation may be accomplished automatically, as shown in Fig. 2. In this embodiment of the invention, the output of the 80 cycle amplifier 44c is transmitted to a controller 46, which is designed to provide a mechanical output that is directly proportional to the electrical input thereto. Controllers of this type are well known in the art and need not be described in detail herein. The mechanical output of the controller 46 is made available at a shaft 47, on which is mounted a conventional type pinion 48 engaging a rack 49. Mounted on the rack 49 is an insulated contact 50 which is adapted to slide along the variable resistance 19.

In operation, so long as the 80 cycle output of the oscillator 11c remains constant, the slider 50 will remain fixed in position. However, as soon as any change occurs in the output of the oscillator 11c, the contact 50 will be moved by the rack 49 and pinion 48 a sufficient distance in the proper direction to restore the output of the oscillator 11c to its original value. When that has been done, any similar variation in the outputs of the oscillators 11a and 11b will have been compensated for.

Instead of using an auxiliary or pilot oscillator 11c to provide a signal that varies with the bore hole temperature in the same manner as the outputs of the oscillators 11a and 11b, the output of one of the latter oscillators may be employed as the source of the signal as shown in Figure 3. This may be accomplished by placing a resistance 51 in series with the conductor 14b and impressing a potential related to the voltage drop across the resistor 51 on conventional rectifying means 52. Inasmuch as the output of the oscillator 11b is impressed upon the electrodes $A_2$ and $B_1B_2$, the voltage drop across the resistor will, therefore, be proportional to the current flowing in this electrode circuit which is a power circuit and not a measuring circuit. This power circuit is completed through the bore hole fluid and the earth formations between the A and B electrodes. Normally, this bore hole resistance is very small, so that so far as the operation of the rectifier circuit is concerned, the electrodes $A_2$ and $B_1B_2$ may be considered as shorted together or as having a small relatively constant resistance between them. The rectifier 52 and filter 53 which are essentially connected in series, are then connected in parallel with the resistor 51 and the formations between the electrodes $A_2$, $B_1B_2$. If the electrodes $A_2$, $B_1B_2$ were shorted together, the potential across the resistor 51 would be the potential impressed upon the rectifier and filter. In any event, the potential impressed upon the rectifier 52 and the filter 53 is proportional to the current flowing in the circuit and, therefore, is proportional to the voltage drop across the resistor 51. The output of the rectifying means 52 is filtered by a conventional filter 53 and the direct current component is transmitted through the conductors 54 and 38 to the surface of the earth. There, it passes through a filter 55, designed to pass only direct current, to a conventional recorder 56. If necessary or desirable, the direct current may be amplified before being supplied to the recorder 56.

It will be apparent that the direct current signal provided by the apparatus shown in Figure 3 may be employed to operate means for automatically compensating for any undesired variations in substantially the same manner as shown in Figure 2.

It will be understood from the foregoing description that the invention provides new and improved means for compensating for undesired changes in an operating characteristic of electrical bore hole investigating apparatus that may be produced by variations in a condition of the bore hole, such as its temperature, for example. Moreover, by translating any variation in the control signal into a corresponding mechanical output and utilizing that mechanical output to adjust the electrical energy supplied to the apparatus, the compensation may be accomplished automatically in response to any undesired variation in the output of the oscillators.

It will be further understood that the several embodiments described above may be modified in many respects within the scope of the invention. The specific embodiments disclosed are intended merely to be illustrative and not restrictive. The invention is not to be limited in any way thereby, but is susceptible of numerous changes in form and detail within the scope of the appended claims.

I claim:

1. An electrical bore hole investigating apparatus comprising electrical generating means adapted to be lowered into a bore hole and having an output that tends to vary as a function of the temperature in a bore hole, a source of electrical energy for energizing said generating means, indicating means responsive to the response of said investigating means, second generating means disposed in the bore hole with said first generating means and energized from said source of electrical energy for providing a signal at the surface that is distinguishable from the output of said first generating means and which varies as a function of the temperature in the bore hole in substantially the same manner as the output of said first generating means; and means for automatically controlling the electrical energy supplied to said second generating means to compensate for any deviation of the signal from the second generating means from a reference value and for simultaneously controlling the supply of electrical energy to said first generating means to nullify the variations in its output due to temperature variations.

2. Electrical bore hole apparatus comprising investigating means adapted to be lowered into a bore hole for exploring subterranean formations and having an output indicative of the formations traversed by said bore hole, said investigating means being responsive to variations in the temperature in the bore hole that cause undesirable variations in said output, a source of electrical energy at the surface for energizing said investigating means, indicating means responsive to the output of said investigating means, a generating means disposed in the bore hole with said investigating means and energized from said source of electrical energy for providing a signal at the surface of substantially constant magnitude that is distinguishable from the output of said investigating means and which varies in response to temperature in substantially the same manner as the undesirable variations in the output of said investigating means, and means for controlling in unison the electrical energy supplied to said investigating means and said generating means to adjust said signal to said constant magnitude and simultaneously nullifying the undesired variations in the output of said investigating means.

3. An electrical bore hole apparatus comprising electrical generating means adapted to be lowered into a bore hole and having an output that tends to vary as a function of the temperature in a bore hole, a source of electrical energy at the surface for energizing said generating means, electrode means movable with said generating means and responsive to the output of the latter for providing another output indicative of the earth formations traversed by the bore hole, an indicator responsive to said another output connected to said electrode means, electrical signalling means connected to said generating means for providing a remote signal that varies with the variations in the output of said generating means due to temperature variations, and adjustable means for controlling the energy supplied to said generating means from the source to compensate for such variations in the output of said generating means by adjusting said energy controlling means to restore said remote signal to a reference value.

4. An electrical bore hole apparatus comprising alternating electrical generating means adapted to be lowered into a bore hole and having an output that tends to vary as a function of the temperature in a bore hole, a source of electrical energy for energizing said generating means, electrode means movable with said generating means and responsive to the output of the latter for providing another output indicative of the earth formations traversed by the bore hole, an indicator connected to said electrode means and responsive to said another output, electrical means connected to said generating means for producing an alternating electric signal that varies with the variations in the output of said generating means due to temperature variations, electrical means for rectifying said electrical signal, indicating means located at a remote point, an electric circuit connecting said rectifying means and indicating means, and adjustable means for controlling the energy supplied to said generating means from the source, to compensate for such variations in the output of said generating means by adjusting said energy controlling means to restore said rectified value to a reference value.

5. An electrical bore hole investigating means comprising alternating electrical generating means adapted to be lowered into a bore hole and having an output that tends to vary as a function of the temperature in a bore hole, a source of electrical energy for energizing said generating means, electrode means movable with said generating means and responsive to the output of the latter for providing another output indicative of the earth formations traversed by the bore hole, an indicator responsive to said another output connected to said electrode means, an impedance connected in circuit with said generating means, electrical means for rectifying the voltage developed across said impedance, indicating means located at a remote point, an electric circuit connecting said rectifying means and indicating means, and adjustable means for controlling the energy supplied to said generating means from the source to compensate for any variation in the output of said generating means due to temperature variations by adjusting said energy controlling means to restore said rectified voltage to a reference value.

6. An electrical apparatus for use in investigating subterranean formations traversed by a bore hole where the output tends to vary undesirably and unpredictably as a function of its environment, comprising a first electrical apparatus whose output is to be maintained constant, a second similar electrical apparatus in close proximity thereto, an indicator at the surface of the earth connected to said second apparatus, and means at the surface of the earth for altering the input potential to said first and said second apparatus in unison to adjust said indicator to a reference value and maintain constant the output of said second apparatus.

CHARLES B. AIKEN.